United States Patent
Rogers

[11] Patent Number: 6,089,670
[45] Date of Patent: Jul. 18, 2000

[54] DETACHABLE SIDE DUMP BODY

[75] Inventor: Ralph R. Rogers, 817 E. 29th St., South Sioux City, Nebr. 68776

[73] Assignee: Ralph R. Rogers, S. Sioux City, Nebr.

[21] Appl. No.: 09/248,126

[22] Filed: Feb. 10, 1999

[51] Int. Cl.[7] .................................................... B60P 1/48
[52] U.S. Cl. ........................ 298/11; 298/17.5; 298/17.6; 298/17.7; 298/17.8; 298/18; 410/470; 410/500
[58] Field of Search ....................... 298/11, 17.5, 17.6, 298/17.8, 18, 17.7; 414/470, 486, 487, 498, 500, 546, 550, 552, 555

[56] References Cited

U.S. PATENT DOCUMENTS

| | | |
|---|---|---|
| 899,108 | 9/1908 | Hansen . |
| 1,311,644 | 7/1919 | Flom . |
| 1,325,495 | 12/1919 | Lee . |
| 1,539,492 | 3/1925 | Jefferis . |
| 2,072,998 | 3/1937 | Allin ............................................ 298/18 |
| 2,530,613 | 11/1950 | Hopper ........................................ 298/18 |
| 3,019,054 | 1/1962 | Stahly ......................................... 298/18 |
| 3,238,897 | 3/1966 | Flowers ..................................... 105/276 |
| 3,323,838 | 6/1967 | Trucco et al. ............................... 298/8 |
| 3,508,503 | 4/1970 | Daly ........................................... 105/367 |
| 3,753,593 | 8/1973 | Wells et al. ................................. 298/10 |
| 3,844,617 | 10/1974 | Kostman ..................................... 298/1 |
| 4,200,334 | 4/1980 | Lindholm .................................... 298/7 |
| 4,261,676 | 4/1981 | Balling, Sr. ............................. 298/18 X |
| 4,494,798 | 1/1985 | Bailey ..................................... 298/17.6 |
| 4,619,484 | 10/1986 | Maxey ......................................... 298/18 |
| 4,838,598 | 6/1989 | Hyde ........................................... 296/50 |
| 5,211,518 | 5/1993 | Mimica ....................................... 410/50 |
| 5,234,311 | 8/1993 | Loduha, Jr. et al. ...................... 414/546 |
| 5,322,350 | 6/1994 | Hinson ..................................... 298/1 R |
| 5,480,214 | 1/1996 | Rogers .................................... 298/17.6 |
| 5,597,211 | 1/1997 | Golden .................................... 298/17.6 |
| 5,845,971 | 12/1998 | Rogers ........................................ 298/18 |

FOREIGN PATENT DOCUMENTS

| | | | |
|---|---|---|---|
| 2058661 | 3/1992 | Canada ..................................... 296/184 |
| WO89/02838 | 4/1989 | European Pat. Off. ................... 298/18 |
| 1 231 617 | 12/1966 | Germany .................................. 414/470 |
| 1 456 509 | 1/1969 | Germany .................................. 414/546 |
| 2 348 971 | 5/1974 | Germany .................................. 414/498 |
| 2 641 262 | 3/1977 | Germany .................................. 414/498 |
| 3 007 279 | 10/1981 | Germany .................................. 414/470 |
| 3 818 627 | 12/1989 | Germany .................................. 414/550 |

*Primary Examiner*—D. Glenn Dayoan
*Assistant Examiner*—S. Carpenter
*Attorney, Agent, or Firm*—Zarley, McKee, Thomte, Voorhees & Sease; Dennis L. Thomte

[57] ABSTRACT

A side dump body for use on a truck or trailer is described wherein the side dump body may be pivoted to either side of the truck or trailer to dump the contents thereof. The side dump trailer is operatively connected to a pair of pivotal body mounts which may be utilized to remove the body from the truck or trailer and place the same on the ground adjacent either side of the truck or trailer.

3 Claims, 7 Drawing Sheets

DETACHABLE SIDE DUMP BODY

BACKGROUND OF THE INVENTION

1. Field of the Invention

This invention relates to a side dump body for a truck or trailer and more particularly to a side dump body for a truck or trailer which may be selectively removed therefrom and positioned on the ground at either side of the truck or trailer.

2. Description of the Related Art

Side dump bodies for use on trucks or trailers have become extremely popular in recent years since the introduction of the side dump trailer of applicant which is disclosed in U.S. Pat. No. 5,480,214. In applicant's original side dump trailer, the side dump body could be pivoted to either side of the truck or trailer to dump materials from the body at either side of the truck or trailer. It has been discovered by applicant that it is advantageous to be able to remove the side dump body from the truck or trailer and to position the same on the ground at the side of the truck or trailer. One advantage of being able to remove the side dump body from the truck or trailer is that the side dump body could be left at a construction site or manufacturing facility, with scrap materials being placed therein for subsequent removal. Further, a removable side dump body would be useful in that it would enable a loaded side dump body to be left at a particular location until the materials therein have been consumed. It is believed that the ability to place the side dump body on the ground at either side of the truck or trailer and to subsequently recover the same for positioning on the truck or trailer is an advantage over the end-loading type waste receptacles which are usually winched onto the rear end of a truck or pushed rearwardly from the truck.

SUMMARY OF THE INVENTION

A side dump body for use on a truck or trailer is disclosed with the side dump body being selectively removably positioned on the wheeled frame of the truck or trailer. Upstanding front and rear body mounts are pivotally mounted on the wheeled frame and have a side dump body positioned therebetween. The forward and rearward ends of the side dump body are selectively detachably secured to the front and rear body mounts, respectively. When the side dump body is affixed to the front and rear body mounts, the side dump body will move with the body mounts to enable the material in the side dump body to be dumped therefrom at either side of the wheeled frame. When the side dump body is detached from the front and rear body mounts, extendible mast assemblies on the front and rear body mounts lift the side dump body from the wheeled frame. When the side dump body has been lifted from the wheeled frame, the body mounts are pivotally moved towards one side of the wheeled frame so that the extendible mast assemblies may lower the side dump body onto the ground at the desired side of the wheeled frame. The fact that the side dump body is selectively removable from the wheeled frame enables the side dump body to be left at a job site and enables different side dump bodies to be mounted on the wheeled frame after the original side dump body has been removed therefrom.

It is therefore a principal object of the invention to provide an improved side dump body.

Yet another object of the invention is to provide a side dump body which is detachably mounted on a truck or trailer.

Still another object of the invention is to provide a side dump body including means for raising the side dump body from the truck or trailer frame and to position the side dump body at either side of the truck or trailer frame.

Yet another object of the invention is to provide a side dump body which not only may be removed from the wheeled frame of the truck or trailer, but which may be operated in conventional fashion as desired.

These and other objects of the invention will be apparent to those skilled in the art.

DESCRIPTION OF THE PREFERRED EMBODIMENT

Figure 1:
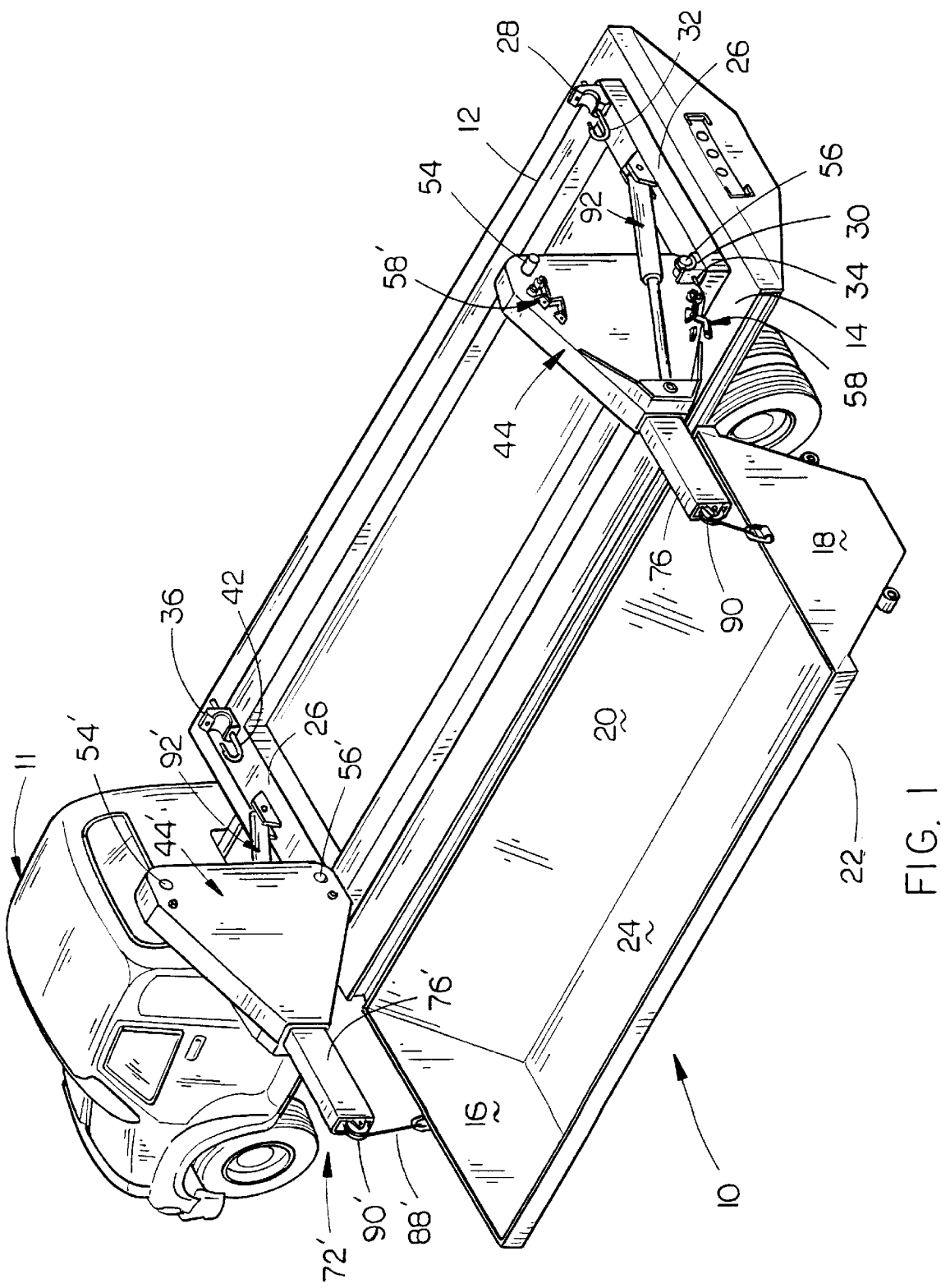
FIG. 1 is a rear perspective view of the side dump body of this invention mounted on a truck, although the same could be mounted on a trailer.
Figure 2:
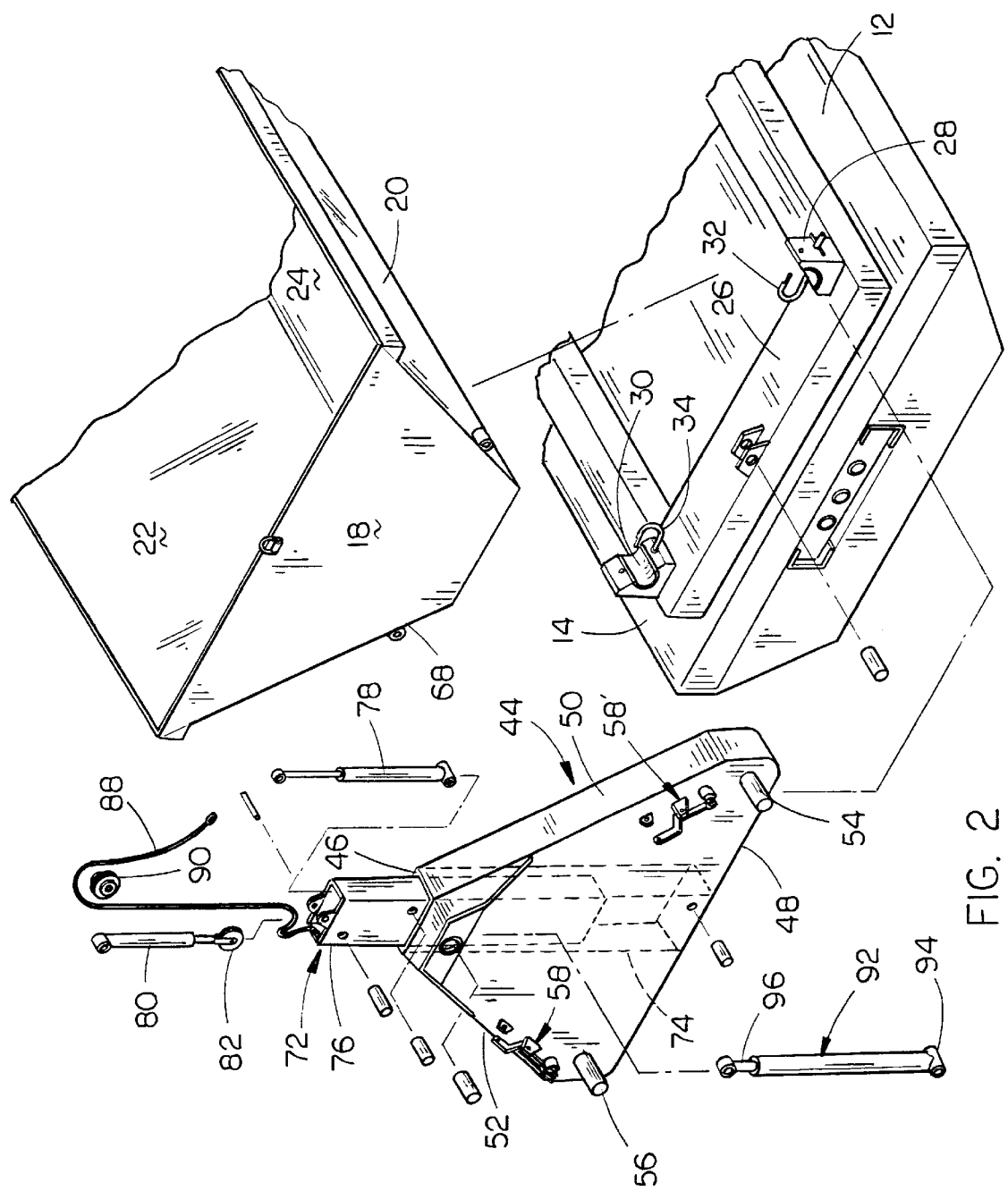
FIG. 2 is a partial exploded perspective view of the side dump body of this invention.

The numeral 10 generally refers to the side dump body of this invention. Although the drawings illustrate that the side dump body 10 is mounted on a truck 11, the side dump body 10 could be mounted on any suitable trailer frame including longitudinally extending frame members 12 and 14. For purposes of description, side dump body 10 will be described as including a front wall 16, back wall 18, side walls 20 and 22, and bottom wall 24.

A plurality of cross members 26 are secured to the frame members 12 and 14 and extend transversely thereacross, as illustrated in the drawings. A pair of saddle supports 28 and 30 are mounted on opposite ends of a cross member 26 positioned at the rearward end of the trailer and have locking slides 32 and 34 associated therewith. Saddle supports 36 and 38 (not shown) are provided on opposite ends of a cross member 26 at the forward end of the trailer and have locking slides 42 associated therewith.

The numeral 44 refers to an upstanding rear body mount 44 having an upper end 46, lower end 48, and sides 50 and 52. A pair of pivot pins 54 and 56 are positioned in the lower outer corners of the rear body mount 44, as seen in the drawings, and are adapted to be received by the saddle supports 28 and 30, respectively. A pair of locking mechanisms 58 and 58' are provided on the lower outer corners of the body mount 44, as illustrated in the drawings. Inasmuch as locking mechanisms 58 and 58' are identical, only locking mechanism 58 will be described in detail with "'" being utilized on locking mechanism 58' to indicate identical structure on locking mechanism 58'.

Figure 3:
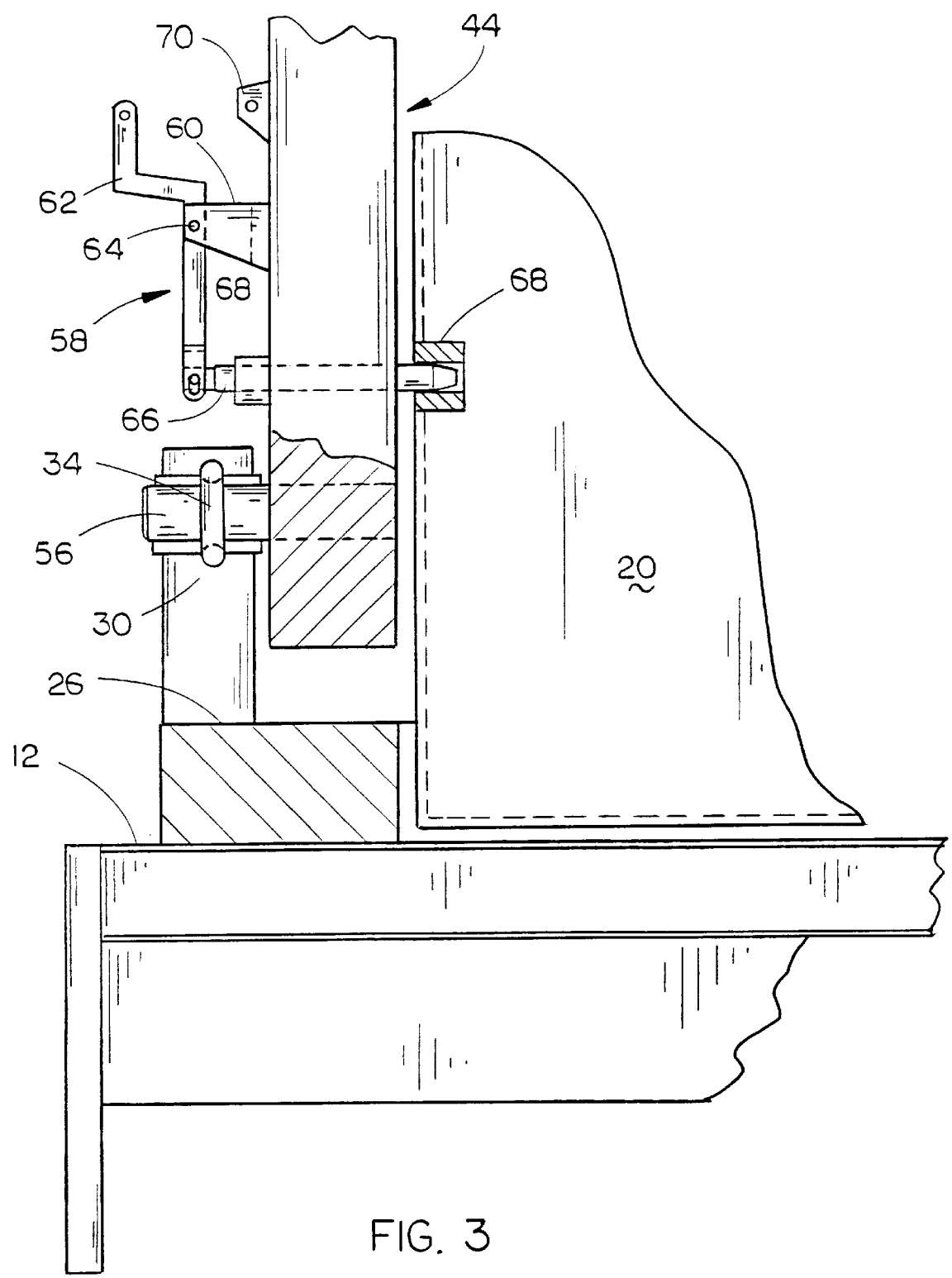
FIG. 3 is an elevational view illustrating the manner in which the side dump body is detachably secured to one of the body mounts.

Locking mechanism 58 includes a bracket 60 which is positioned on the rearward face of body mount 44 and which has a handle 62 pivotally secured thereto at 64. The lower end of handle 62 has a locking pin 66 pivotally secured thereto which extends forwardly through a sleeve 68 which extends through body mount 44. The forward end of pin 66 is tapered, as indicated in FIG. 3, and is adapted to be received by a lock collar 68 secured to and positioned on the exterior surface of side wall 22 or side dump body 10. Handle 62 may be selectively secured to bracket 70 mounted on the rearward surface of body mount 44 to maintain the locking pin 66 in its retracted position as desired.

Rear body mount 44 is provided with an extendible mast assembly 72 which comprises a fixed frame 74 positioned in the interior of body mount 44 and a movable frame 76 which is slidably mounted in fixed frame 74. Frame 76 is selectively movable with respect to frame 74 by means of hydraulic cylinder 78. The numeral 80 refers to a hydraulic cylinder also mounted in the extendible mast assembly 72 and which has a pulley 82 rotatably mounted on the outer end of the cylinder shaft 84. End 86 of cable 88 is fixed to frame 76 and extends inwardly into the mast assembly 72 and extends around the pulley 82, as illustrated in the drawings. Cable 88 extends outwardly through the mast assembly 72 and extends over and around a swivel pulley 90. Hydraulic cylinder 92 is pivotally connected at its base end 94 to the wheeled frame and has its cylinder shaft 96 pivoted to body mount 44. Hydraulic cylinder 92 is adapted to pivotally move the rear body mount 44 with respect to the saddle supports, either to one side or the other, depending upon which of the slide assemblies are locked.

The numeral 44' refers to a front body mount which is pivotally mounted on the wheeled frame forwardly of the front wall of the side body and which is identical to rear body mount 44. Inasmuch as front body mount 44' is identical to rear body mount 44, front body mount 44' will not be described in detail with "'" indicating identical structure on body mount 44'.

When the apparatus of this invention is being used to transport loads from one location to another, the body mounts 44 and 44' will be in their upright positions (FIG. 4) with the pivot pins thereof being received in the saddle supports with the locking slide assemblies being locked to prevent the body mounts 44 and 44' from pivoting. The mast assemblies 72 and 72' will be in their retracted positions and the locking pin assemblies 58 and 58' will be in their extended positions to prevent movement of side dump body 10 with respect to body mounts 44 and 44'.

Figure 4:
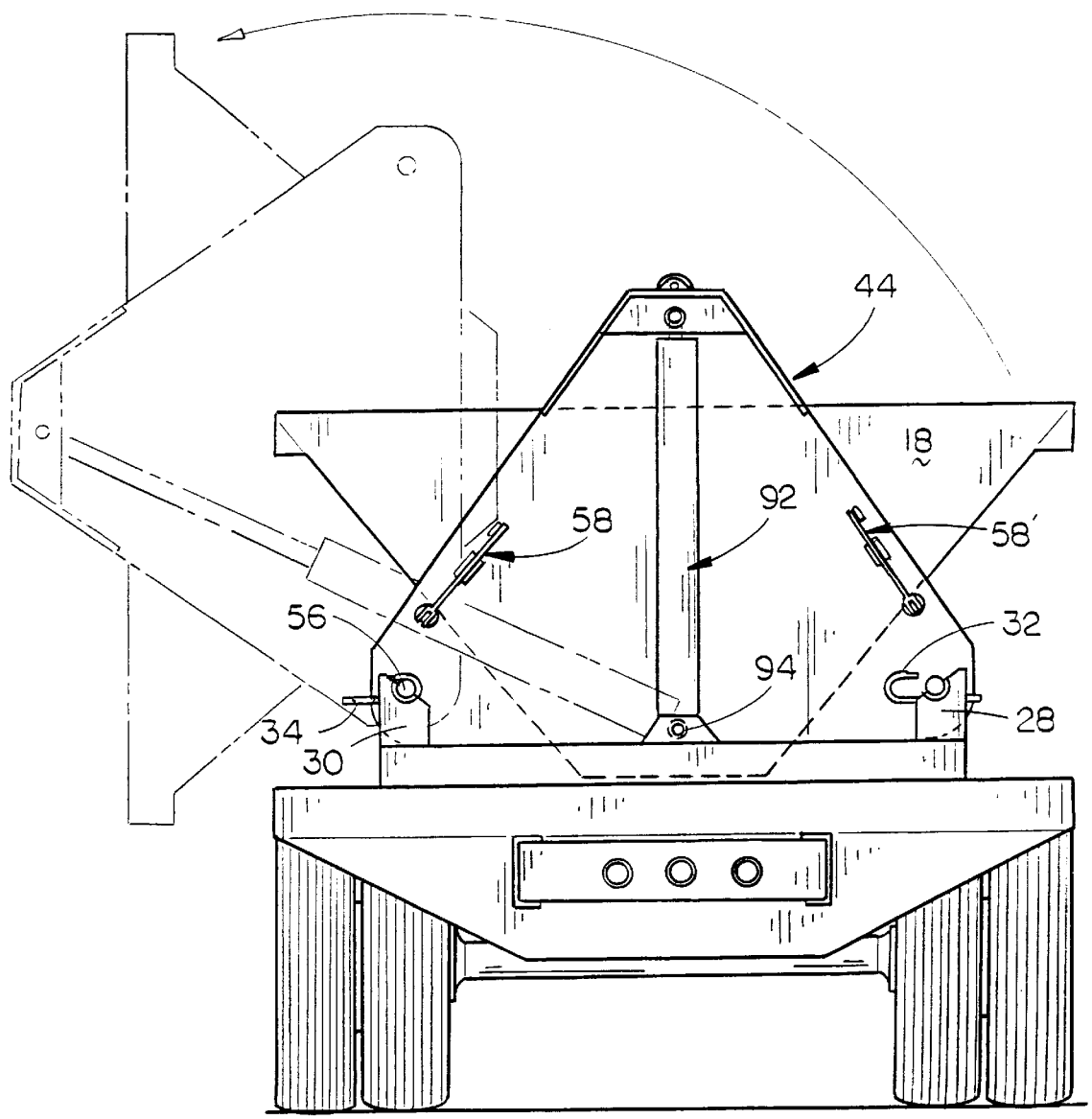
FIG. 4 is a rear view of the side dump body of this invention with the broken lines illustrating the side dump body having been moved to its dumping position.

When the truck or trailer has reached the desired location and it is desired to dump materials, the locking slides on the side of the truck or trailer opposite to the direction of dumping will be unlocked and the hydraulic cylinders 92 and 92' will be actuated to cause the body mounts 44 and 44' to pivot to the position illustrated by broken lines in FIG. 4. Movement of the body mounts 44 and 44' will also cause the side dump body 10 to move thereof so that the side dump body 10 is in its dumping position, as illustrated in FIG. 4.

Figure 5:
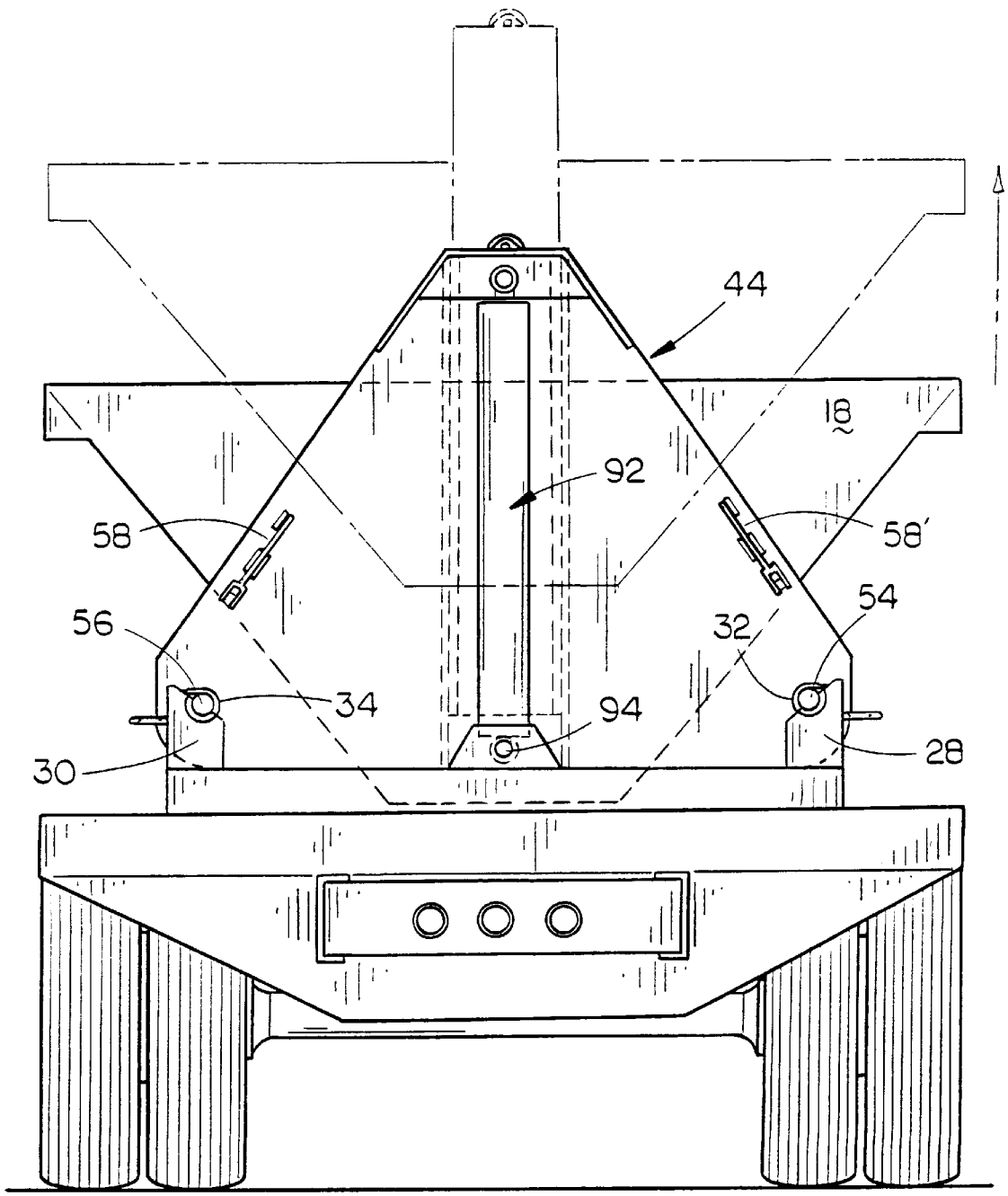
FIG. 5 is a rear elevational view of the side dump body of this invention with the broken lines illustrating the manner in which the body may be moved vertically with respect to the body mounts.
Figure 6:
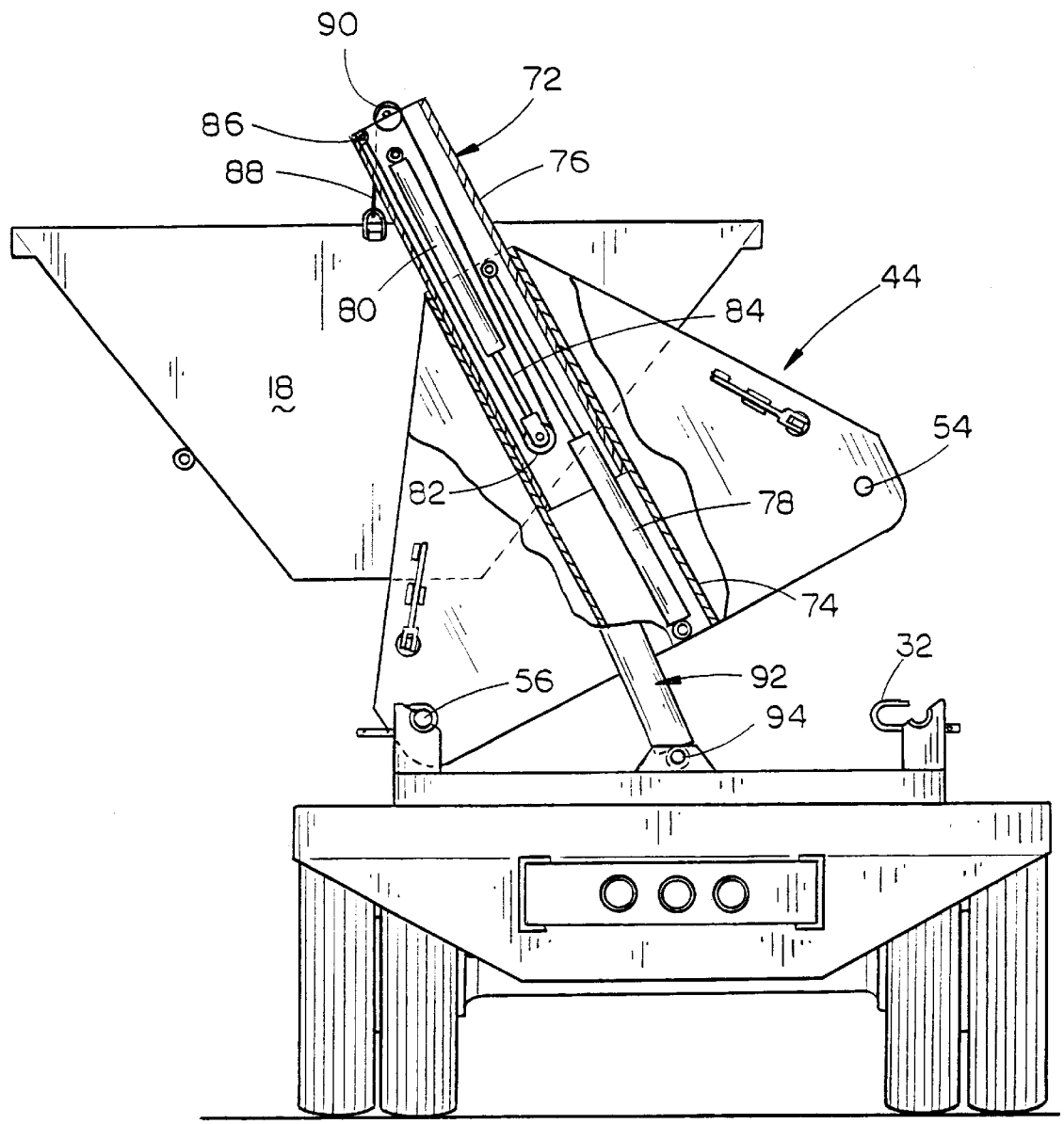
FIG. 6 is a rear elevational view which illustrates the body being removed from the truck or trailer with portions thereof cut away to more fully illustrate the invention.
Figure 7:
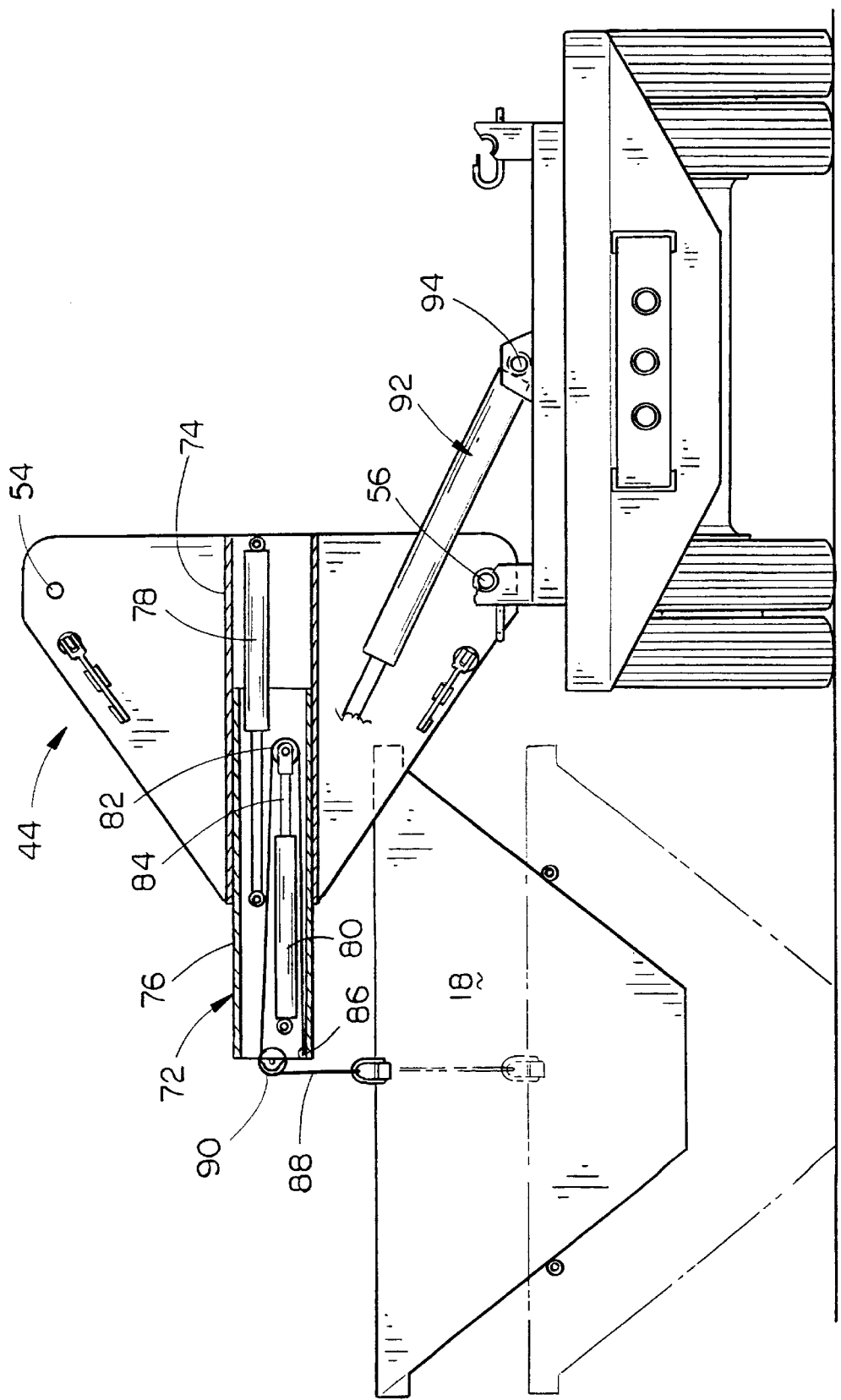
FIG. 7 is a rear elevational view of the side dump body of this invention illustrating the manner in which the body is placed on the ground.

When it is desired to place the side dump body 10 at either side of the truck or trailer, the procedure is as follows. Again, the body mounts 44 and 44' would initially be in their upright position. If it is desired to place the side dump body 10 on the ground at the left side of the truck or trailer, as viewed in FIG. 1, the locking slides 32 and 42 at the right side of the truck or trailer will be released to disengage one side of the body mounts 44 and 44' from their locking engagement with the locking slide mechanisms. The locking pins 54, 56, 54' and 56' on the body mounts 44 and 44' are then retracted to disengage the body 10 from the body mounts 44 and 44'. The cables 90 and 90' would be connected to the opposite ends of the side dump body 10 and the hydraulic cylinders 78 are then extended to lift the side dump body 10 from its engagement with the wheeled frame, as illustrated by broken lines in FIG. 5. When the side dump body 10 has been sufficiently raised to clear the wheeled frame of the truck or trailer, the hydraulic cylinders 92 and 92' are extended to cause the body mounts 44 and 44' to pivot to the position illustrated in FIG. 6. The hydraulic cylinders 78 and 78' would be extended sufficiently so that the side dump body 10 will clear the side of the truck or trailer. Hydraulic cylinders 80 are then retracted so that the side dump body 10 will be lowered into ground engagement, as seen in FIG. 1. The cables 90 and 90' may then be disconnected from the side dump body 10 so that the side dump body 10 may remain at the desired location. At that time, a different side dump body could be loaded onto the truck if so desired.

When it is desired to load the side dump body 10 onto the wheeled frame from its ground engaging position to the transport position, the procedure described above is reversed.

Thus it can be seen that a novel side dump truck or trailer has been provided which enables the side dump body to not only be operated in its conventional fashion, but which also enables the side dump body to be removed from the truck or trailer and placed on the ground, as discussed hereinabove.

Thus it can be seen that the invention accomplishes at least all of its stated objectives.

I claim:
1. In combination:

an elongated wheeled frame having a front end, a rear end, a first side, and a second side;

a side dump body positioned on said wheeled frame having a front end, a rear end, a first side, and a second side; said side dump body including a front wall, a rear wall and opposite side walls having upper ends which define an open upper end;

a front body mount positioned on and pivotally secured to said wheeled frame forwardly of said front end of said side dump body;

a rear body mount positioned on and pivotally secured to said wheeled frame rearwardly of said rear end of said side dump body;

said front body mount having an upper end, a lower end, a first side, and a second side;

said rear body mount having an upper end, a lower end, a first side, and a second side;

said front body mount being pivotally secured, at its lower end adjacent said first side of said front body mount, to said wheeled frame whereby said front body mount is selectively movable between first and second positions with respect to said wheeled frame;

said rear body mount being pivotally secured, at its lower end adjacent said first side of said rear body mount, to said wheeled frame whereby said rear body mount is selectively movable between first and second positions with respect to said wheeled frame;

said front and rear ends of said side dump body being selectively detachably secured to said front and rear body mounts, respectively, whereby said side dump body moves with said front and rear body mounts when attached thereto and whereby said side dump body may be detached from said front and rear body mounts to permit said side dump body to be moved with respect thereto;

front and rear actuators connected to said front and rear body mounts, respectively, for pivotally moving said front and rear body mounts between their said first and second positions;

a first extendible mast assembly mounted on said front body mount;

a second extendible mast assembly mounted on said rear body mount;

said first and second extendible mast assemblies being selectively detachably connected to said side dump body whereby said mast assemblies may lift said side dump body from engagement with said wheeled frame, when said side dump body is detached from said body mounts and said body mounts are in their said first positions, and whereby said mast assemblies may place said side dump body on the ground adjacent said first side of said wheeled frame when said body mounts are in their said second positions;

said side dump body being positioned in a side dumping position whereby the contents of said side dump body may be dumped therefrom through said open upper end when said side dump body is attached to said body mounts and said body mounts have been pivotally moved to their said second positions.

2. The combination of claim 1 wherein said body mounts may be selectively pivoted towards either said first or second sides of said wheeled frame and whereby said mast assemblies may position the side dump body at either said first or said second side of said wheeled frame when said dump body is detached from said body mounts.

3. The combination of claim 1 wherein said side dump body is detachably fixed to said front and rear body mounts so that said side dump body does not move with respect to said front and rear body mounts when said front and rear body mounts are moved between their said first and second positions.

\* \* \* \* \*